United States Patent

Möller

[11] Patent Number: 5,596,790
[45] Date of Patent: Jan. 28, 1997

[54] HOSE CLAMP

[75] Inventor: Rudolf Möller, Attendorn, Germany

[73] Assignee: Muhr und Bender, Attendorn, Germany

[21] Appl. No.: 560,969

[22] Filed: Nov. 20, 1995

[30] Foreign Application Priority Data

Nov. 23, 1994 [DE] Germany .......................... 44 41 439.0

[51] Int. Cl.$^6$ ................................................. B65D 63/00
[52] U.S. Cl. .................... 24/20 EE; 24/20 TT; 24/20 R; 24/20 S
[58] Field of Search ............................. 24/20 R, 20 EE, 24/20 TT, 20 S

[56] References Cited

U.S. PATENT DOCUMENTS

| | | | |
|---|---|---|---|
| 4,773,129 | 9/1988 | Muhr | 24/20 EE X |
| 4,858,279 | 8/1989 | Kato et al. | 24/20 EE X |
| 4,930,192 | 6/1990 | Muhr | 24/20 EE X |
| 4,969,240 | 11/1990 | Sauer | 24/20 TT X |
| 5,203,809 | 4/1993 | Oetiker | 24/20 EE X |
| 5,283,931 | 2/1994 | Oetiker | 24/20 TT X |
| 5,390,395 | 2/1995 | Oetiker | 24/20 TT X |
| 5,414,905 | 5/1995 | Kimura et al. | 24/20 TT X |
| 5,537,721 | 7/1996 | Oetiker | 24/20 EE X |

FOREIGN PATENT DOCUMENTS

| | | | |
|---|---|---|---|
| 3041106 | 5/1982 | Germany | 24/20 EE |
| 560347 | 3/1975 | Switzerland | 285/243 |

Primary Examiner—Peter M. Cuomo
Assistant Examiner—Hanh V. Tran
Attorney, Agent, or Firm—Sixbey, Friedman, Leedom & Ferguson, P.C.; David S. Safran

[57] ABSTRACT

The invention relates to a hose clamp (1) with a clamp body (3) which encloses a hose end (2) essentially in a ring with overlapping end areas (4,5). In the clamped state, the clamp body has an initial diameter, and using a clamping tool, the clamp body (3) can be spread to a second, larger diameter against its own spring force. In a first end area (4), there is a catch projection (6) which is offset rearward relative to its outer front edge (7) and which can be engaged with a second end area (5) of the clamp body (3) to achieve the spread state. The second end area (5) has a longitudinally extended recess (8) which holds first end area (4) which is correspondingly narrower. To be able to easily spread and release hose clamp (1), in a way which enables the attainment of the spread state is to be easily recognizable, a catch projection (6) is provided on the first end area (4,) in the spread state of the clamp body, rests against the front edge (10) of the second end area (5).

13 Claims, 2 Drawing Sheets

HOSE CLAMP

BACKGROUND OF THE INVENTION

1. Field of the Invention

The invention relates to a hose clamp with an essentially ring-shaped clamp body which encloses one end of a hose, with end areas of the clamp body overlapping in the clamped state, a clamping tool being used to spread the clamp body to a larger diameter against its own spring force. In particular, to such a hose clamp in which a first end area of the clamp body has a catch projection which is rearwardly offset relative to its front outer edge and which can be engaged with a second end area to achieve the spread state, the second end area having a longitudinally extended recess to hold the first end area which is correspondingly narrower.

2. Description of Related Art

A hose clamp of the type mentioned initially, which is usually also called a spring band clip, is already known from German Patent DE 30 41 106. In this known hose clamp, on the second end area there is a section which runs roughly radially, adjoined by a cover section which runs roughly at a right angle to the latter (i.e., in a generally tangential direction), so that it overlaps the front end of the first end area in the spread state. The spread state is implemented by the free edge of the first end area catching behind the section which runs roughly radially and under the cover section. In one embodiment, a bead which is pressed out of the material of the clamp body is provided in the first end area at a distance from the front free edge. This bead has a sharp front edge which is placed against the radial section in the spread position.

The known hose clamp has the advantage that it consists simply of a single piece and due to its design is rather small when installed. The disadvantage is that, in the various embodiments, the spread state is rather difficult to accomplish since the front free edge, itself, is used as a stop on the radial section, and therefore, cannot be used to catch or attach the clamping tool. In the aforementioned embodiment, which has the pressed-out bead, catching of the clamping tool on the free front edge is possible since the bead is offset rearward relative to the free front edge; however, in the clamped state the sharp edges of the bead are exposed so that there is the danger of injury to an installer who unintentionally comes into contact with the bead.

Another important disadvantage of this known hose clamp is that, moreover, there is the danger of overstretching of the hose clamp during spreading. This can happen relatively easily since the installer cannot see, during spreading, when the spread state is attained due to the fact that the interlocking between the bead and the radial section of the cover section is hidden. Spreading the hose clamp too much can result in damage which adversely affects its function due to overstretching of the clamp body; as a result, this can lead to leaks at the corresponding hose-connection piece coupling.

SUMMARY OF THE INVENTION

Therefore, a primary object of the present invention is to provide a hose clamp which takes a new approach that avoids the aforementioned disadvantages of the initially mentioned known hose clamp.

This object is achieved according to the invention causing the catch projection of the first end area of the clamp body to rest in the spread state against the free or outer edge of the second end area. In the hose clamp known from DE-C-30 41 106, not only is such a catch project not provided, but the cover section is not suited for a catch projection to catch upon the front free or outer edge of the cover section. Incidentally, in the known hose clamp, when the clamp body reaches this state it is also largely overstretched.

By means of the measure according to the invention, which seems rather simple in retrospect, it is easily possible for the installer to visually detect that the spread state has been attained in the spreading process since the catch projection rests directly against the front free edge of the second end area, and thus, is easily visible from the outside during installation. Moreover, the two end areas can be easily used to attach the clamping tool used for spreading of the clamp body.

It is especially advantageous if, in addition to the possibility of optical monitoring by the installer of whether and when the spread state has been reached during spreading, a mechanically effective overstretch protective device is provided which works between the end areas. This mechanical overstretch protection device essentially prevents spreading of the hose clamp beyond the desired degree of spreading intended for the spread state. Preferably, the hose clamp can be spread only 1 to 5 mm farther after the spread state is reached. In any case, by providing one such mechanical overstretch protection device, overstretching, and thus possible damage of the hose clamp, are prevented.

A structurally especially simple configuration of the overstretch protection device comprises an arm which serves as a stop. This arm extends from a transverse crosspiece which is on the front end of the second end area at which a recess is provided. The transverse crosspiece, on the one hand, forms a clamp end of the second end area which can be used for attachment of a clamping tool, and on the other hand, it has a front free edge which forms the catch stop for the catch projection. When the hose clamp is spread using a clamping tool, either the first end area or the clamping tool makes contact with the arm before the clamp body is spread beyond the maximally suitable spread state.

To further simplify the attachment of the clamping tool to the hose clamp, according to the invention, moreover, it is provided that there is a clamp end of the first end area on the front free end of the first end area, which projects out of the recess, and which is pointed outward. The clamping tool is attached then, on the one hand, to the first clamp end, and on the other hand, to the front free edge, i.e., to the transverse crosspiece of the second end area.

It is especially advantageous if the arm on the second end area and the first clamp end on the first end area interact to protect against overstretching. In doing so, the front free end of the arm makes contact with the first clamp end after reaching the spread state as spreading continues.

The problem of potential injury with the known hose clamp due to the sharp edges of the hose clamp being exposed in the clamped state where an installer can unintentionally contact such a sharp edge is prevent in the present invention. In particular, to prevent such an injury, the arm overlaps the catch projection in the clamped state. This, therefore, means that the arm must have a corresponding length which, on the one hand, takes into account overlapping of the arm in the clamped state, and on the other hand, also the aforementioned concerns of overstretch protection.

To make unlocking of the hose clamp according to the invention as easy as possible, the arm has an outwardly directed roof-like bevel or arch. By means of this bevel or arch of the arm, in the spread state of the hose clamp, an engagement opening is formed between the bottom of the arm and the top of the first end area, this engagement opening being suitable for engaging a screwdriver, for example. By inserting a screwdriver into the engagement opening and exerting a corresponding lever force, the hose clamp can be unlocked or loosened in an especially simple manner.

In another preferred embodiment of this invention, a step is provided in the front area of the second end area. This step has a height which corresponds roughly to the material thickness of the first end area. This measures ensures that, when the hose clamp is spread and loosened, the top of the first end area does not rub against the bottom of the second end area, i.e., especially against the transverse crosspiece; if not prevented such rubbing would not only make spreading of the clamp body difficult but it may prevent loosening or springing into the clamped state, and also leads to damage to the anticorrosion layer which is generally applied to the clamp body as a result of scraping or scratching thereof. Moreover, with a hose clamp having a circular cross section, this measure leads to a uniform force distribution being achieved, especially in the clamped state.

It is, furthermore, provided that the arm and the catch projection are roughly on a central peripheral line of the clamping body. This ensures that the bottom of the arm is used more or less as a guide for the projection when the hose clamp is spread, until the catch projection catches on or behind the front free edge of the second end area, and therefore, behind the transverse crosspiece. Moreover, this measure ensures that the catch projection does not unintentionally come into contact with the edge of the recess during spreading, which could lead to problems in spreading.

Instead of the aforementioned embodiment of the overstretch protection device with the arm which extends from the end of the second end area, in another advantageous embodiment it is provided that a stop is formed on the first end area for interacting with the second end area as an overstretch protection means. It is especially advantageous if the stop is formed independently of the outer front end of the first end area and is located between the latter and the catch projection. Due to the independence or separate formation of the stop from the outer front end of the first end area, the stop always remains unaffected by the outer front end of the first end area via which it is conventionally also tensioned. Generally, this outer end is bent in the production of the hose clamp for forming one clamp end, in which in the mass production of the hose clamps considerable tolerances can arise which ultimately, in turn, can lead to the fact that, in spite of an overstretch protection device being provided, damage to the hose clamp can occur. This cannot take place in the separate formation of the stop itself and especially not when this stop has been punched out; this is because, in contrast to bending, there are hardly any tolerances in punching.

At this point it should be noted that, due to the aforementioned advantages, it is desirable for the catch projection to be recognizable from the outside after the spread state is attained. Based on the stop for overstretch protection, which is located in the immediate vicinity of the catch projection, it is not, however, absolutely necessary, since reaching the spread state is detectable by the installer, at latest, when contact is made with the stop. This holds when the overstretch protection means is also implemented via the first mentioned embodiment thereof.

In terms of production engineering, it is especially simple, and thus cost favorable, if the stop and the catch projection are produced in one process step, i.e., in a single punching process. For this reason, the stop and the catch projection on the edge side, and preferably on a common edge, can be provided on the first edge area. In particular, when these two elements have been produced in a single punching step, they are formed as branches pointed towards one another, between which there is only a short distance for holding the corresponding stop element of the second end area for interaction or locking with it.

In order that the above described hose clamp can be spread in an especially easy manner, moreover, it is provided that the end of this first end area has a first clamp end which extends roughly in the radial direction and/or the second end area has a second clamp end which, likewise, extends roughly in the radial direction. In this case, then, an outer side of the second clamp end interacts for locking with the catch stop, while the opposite, inner side of the second clamp end interacts with the overstretch protection stop during spreading. For this reason, the second clamp end has a transverse crosspiece for making contact with the catch projection and the stop respectively. Moreover, on the transverse crosspiece, adjacent to the area of the stop or the catch projection, there is a recess for engaging a tool, for example, a screwdriver, in order to release the lock and to bring the hose clamp into its clamped state.

Another advantage of the stop which is independent or separate from the second clamp end is that, based on the distance of the stop to the first clamp end, the overlap of the end areas increases. In this way, the force to be applied to the hose in the overlapping area of the end areas can be increased. In particular, by the corresponding formation and arrangement of the stop in the first clamp end an essentially circular force distribution on the hose can be accomplished via the hose clamp. It has been ascertained in tests that the distance from the stop to the first clamp end should be roughly 4 to 15 mm to achieve the aforementioned essentially circular force distribution on the hose.

Other features, advantages and possible applications of this invention follow from the following description of embodiments using the drawing and the drawing itself. In this case all the described and/or depicted features for themselves or in any combination form the subject matter of this invention, regardless of their summary in the patent claims or reference to them.

DETAILED DESCRIPTION OF THE PREFERRED EMBODIMENTS

In FIGS. 1 through 4, a first embodiment of a hose clamp 1 is shown placed on an end 2 of a hose. Hose clamp 1 is used to secure a hose on a hose-connecting piece, for example, in the engine compartment of a motor vehicle. Hose clamp 1 has an essentially annular clamp body 3. Clamp body 3 is comprised of a spring steel strip, end areas 4, 5 of which overlap one another. In the clamped state shown in FIG. 2, hose clamp 1 or clamp body 3 has an inner diameter which is less than or equal to the outside diameter of the hose end 2.

Figure 1:
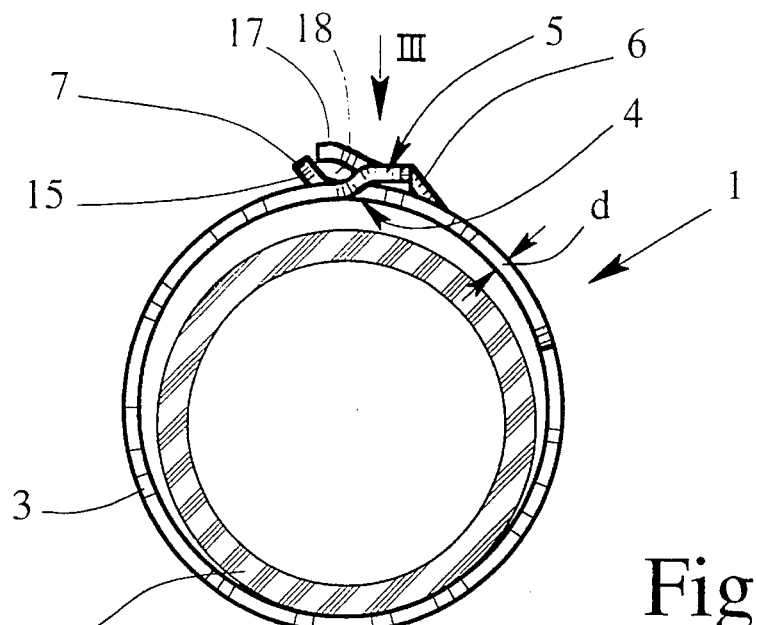
FIG. 1 shows a side view of a hose clamp, pushed onto one end of a hose, in the spread state.

Clamp body 3 can be spread to a second, greater diameter against its own spring force using a clamping tool which is not shown, but which can be pliers. This state, which is hereafter called the spread state, is shown in FIG. 1. In first end area 4, a catch projection 6 is provided offset rearward relative to the front edge 7 of first end area 4. Catch projection 6 is pressed out of the material of clamp body 3 to the outside. To achieve the spread state or to keep hose clamp 1 in the spread state, catch projection 6 can be engaged with the second end area 5.

The two end areas 4, 5 are made differently. First end area 4 is much smaller than the second end area 5. Second end area 5, on the other hand, has longitudinally (circumferentially) extending recess 8 in which first end area 4 is held or located. In addition to recess 8, clamp body 3 can have additional recesses 9 which are used to provide the clamp body 3 with specific spring properties.

Figure 3:
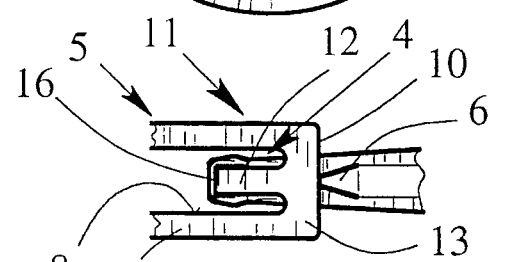
FIG. 3 is a plan view of the end portions of the hose clamp of FIG. 1 as seen in the direction of the arrow III in FIG. 1, but without the hose end.

At this point, it is significant that catch projection 6 of the first end area 4, in the spread state which is shown in FIGS. 1 and 3, adjoins the front free edge 10 of the second end area 5. In this state, the locking which has occurred between the first and second end areas 4, 5 is visually apparent to an installer from the outside with ease (see, FIG. 3).

In addition to the possibility of immediately visually detecting the occurrence of the spread state of hose clamp 1, however, additionally between end areas 4, 5 there is mechanical overstretch protection means 11. This mechanical overstretch protection means 11 prevents spreading of hose clamp 1 significantly beyond the spread state. In this case, the overstretch protection means 11 takes effect when the hose clamp 1 is spread a few millimeters beyond the appropriate spread state. Overstretch protection means 11 includes an arm 12 which extends into the recess 8 from the front end of the second end area 5, which is formed by a transverse crosspiece 13. The transverse crosspiece 13, or more precisely a free front end 10 of the transverse crosspiece 13, forms the (second) clamp end of second end area 5. Arm 12 is used as a stop either for the clamping tool or for the first end area 4 during spreading.

On the end of the first end area 4 is a (first) clamp end 15 which projects from recess 8 and which is directed outwardly. In this embodiment, the first clamp end 15 is used not only for attachment of the clamping tool, but also represents part of overstretch protection means 11 since arm 12 and clamp end 15 interact, such that the free front end 16 of arm 12 makes contact with the clamp end 15 upon further spreading of the clamp body 3 beyond the spread state.

Figure 4:
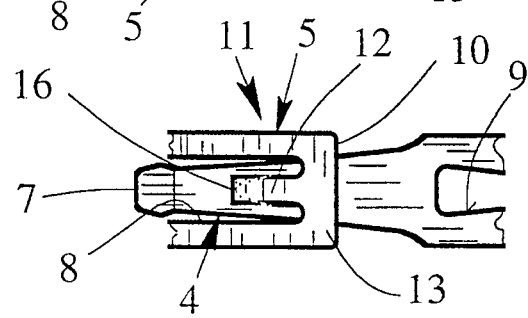
FIG. 4 is a plan view of the end portions of the hose clamp of FIG. 2 as seen in the direction of the arrow IV in FIG. 2, but without the hose end.
Figure 5:
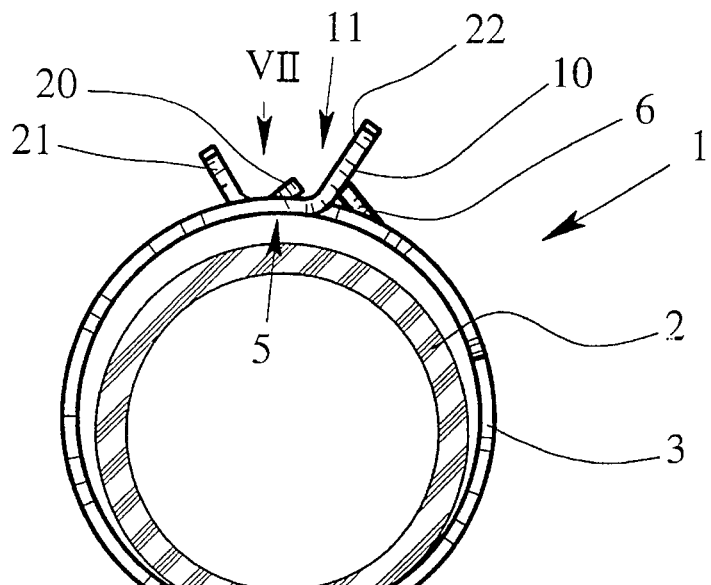
FIG. 5 is a view corresponding to that of FIG. 1, but of another embodiment of a hose clamp according to the invention pushed.

As is especially apparent from FIG. 4, in the clamped state, arm 12 overlaps catch projection 6. Furthermore, arm 12 has roof-like bevel 17 pointed to the outside. An engagement opening 18 is located between the bevel 17 and the top of first end area 4. This engagement opening 18 is used for attachment of a tool, for example, a screwdriver, for unlocking hose clamp 1.

Figure 2:
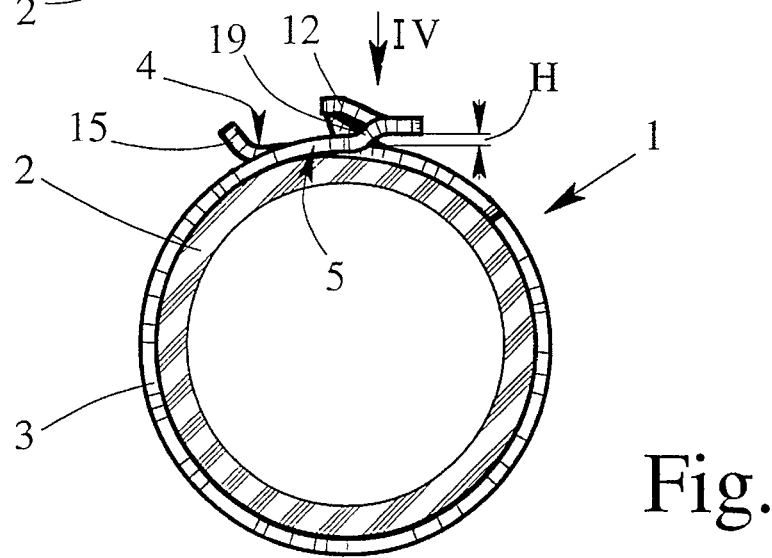
FIG. 2 is a side view of the hose clamp of FIG. 1 in the clamped state.

As follows especially from FIGS. 1 and 2, in the second end area 5 a step 19 is provided which has a height H that corresponds roughly to the material thickness d of first end area 4 or clamp body 3. Finally, as can be seen from FIGS. 3 and 4, arm 12 and catch projection 6 lie roughly on a common peripheral line of clamp body 3, roughly in the middle.

In the embodiment shown in FIGS. 1 through 4, a pressure-tight coupling to a hose-connecting piece is accomplished as follows.

Hose clamp 1 can, first of all, be in the untensioned state (not shown) or can be acquired from the clamp manufacturer already in the spread state of FIG. 1. In any case, the hose clamp 1, in the spread state, is placed on hose end 2. This state is shown in FIGS. 1 and 3. Then, the hose end 2 is placed over the corresponding connecting piece. Subsequently, hose clamp 1 is pushed onto the installation site. Unlocking can be done essentially in any manner. To do this, on the one hand, first end area 4 can be moved down and/or second end are 5 can be moved up. Preferably, a screwdriver is placed in engagement opening 18. By means of a corresponding lever force, the first and second end areas 4, 5 are moved apart, and in doing so, engagement opening 18 is enlarged. As soon as catch projection 6 disengages from front edge 10 of second end area 5, the hose clamp 1 springs into the clamp state shown in FIGS. 2 and 4.

Re-spreading, for example, as the result of unintentional unlocking, or for loosening the hose-connecting piece coupling, can be easily done also without special tools, for example, using simple pliers which need simply be placed on the first damp end 15 and on edge 10. In any case, however, during spreading, after attaining the spread state, the overstretch protection means 11 takes effect, the front free end 16 of arm 12 making contact with clamp end 15.

In FIGS. 5 through 8, another embodiment of a hose clamp according to the invention is shown. This hose clamp 1' corresponds in principle to the one shown in FIGS. 1 through 4, so that the same parts bear the same reference numbers and the foregoing can be referred to as to the common attributes.

In the hose clamp 1' shown in FIGS. 5 through 8, the overstretch protection means 11' has a stop 20 in the first end area 4 which is used for interaction with the second end area 5. As follows from the individual descriptions, stop 20 is independent of the outer front end of first end area 4. Stop 20, in this case, is between the outer front end of the first end area 4 and the catch projection 6. Therefore, stop 20 is a separate element, although it would of course also be possible for the stop 20 to be formed by the outer front end of first end area 4 itself. However, the aforementioned advantages arise by this separate or independent design of stop 20.

Figure 7:
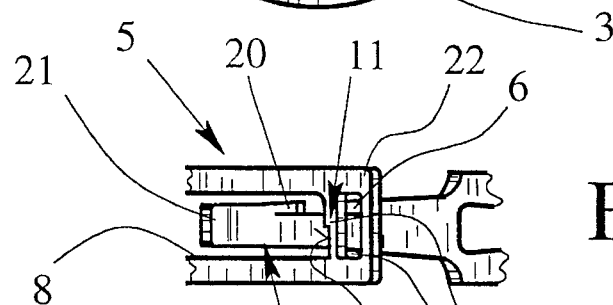
FIG. 7 is a plan view of the end portions of the hose clamp of FIG. 5 as seen in the direction of the arrow VII in FIG. 5, but without the hose end.
Figure 8:
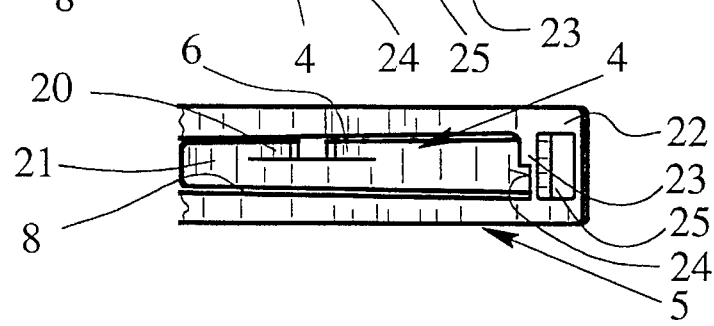
FIG. 8 is a plan view of the end portions of the hose clamp of FIG. 6 as seen in the direction of the arrow VIII in FIG. 6, but without the end of the hose.

For reasons of manufacturing, stop 20 and catch projection 6 are located in first end area 4 of the clamp body 3, at the same longitudinal/circumferential side edge thereof. This can be done especially easily in production, for example, by a single punch step. It is characteristic of punching that the catch projection 6 and stop 20 are made in the form of branches facing one another, as can be seen in FIGS. 7 and 8. However, it should also be pointed out that it is, of course, likewise possible to provide catch projection 6 and stop 20 in the center or also on different edges, and to produce them by stamping instead of by punching. The distance of catch projection 6 from stop 20 is slightly greater than the thickness of transverse crosspiece 23, and is preferably about 2 to 5 mm.

In contrast to the embodiment shown in FIGS. 1–4, in the embodiment shown in FIGS. 5–8, it is provided that the end areas 4, 5 are provided with roughly radially aligned clamp ends 21, 22 which can be easily engaged by a spreading tool. For clarification, it should be pointed out that front free or outer edge 10 is provided for interacting with catch projection 6, presently on the clamp end 22 of second end area 5. It would, moreover, be possible to bend the clamp end 22 down such that, in the spread state, it at least partially overlaps catch projection 6.

Clamp end 22 has a transverse crosspiece 23 on the outside of which there is front free or outer edge 10, with which the outside catch projection 6 and the overstretch protection stop 20 act together. In transverse crosspiece 23, a recess 24 is provided which at least partially overlaps first end area 4, but which, however, does not project into the area of catch projection 6 or stop 20. Moreover, clamp end 22 is provided with an engagement opening 25 for a tool to be attached. Engagement opening 25 is, therefore above recess 24.

Figure 6:
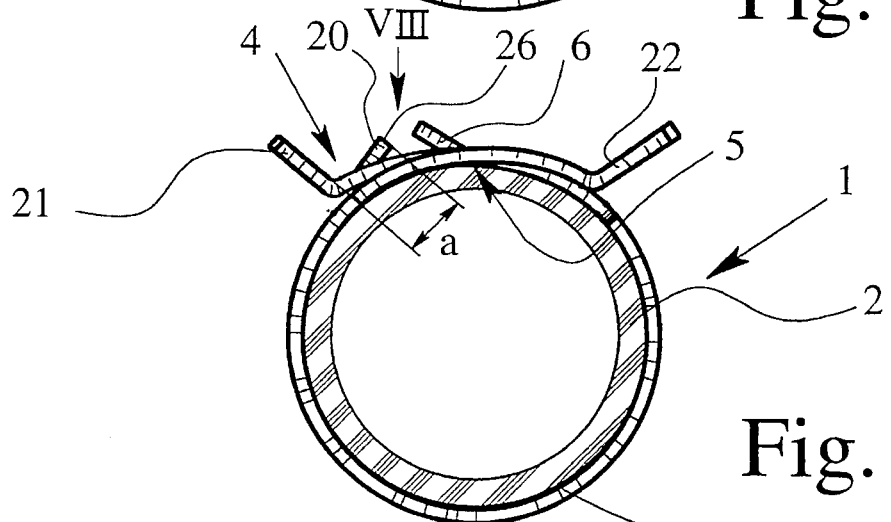
FIG. 6 is a view corresponding to that of FIG. 2, but showing the hose clamp of FIG. 5 in the clamped state.

Between stop surface 26 of stop 20 and first clamp end 21 is distance a FIG. 6) which is between 4 and 15 mm, and thus, the length of first end area 4 is extended accordingly, relative to an embodiment in which clamp end 21 itself acts as the stop, instead of a separate stop being provided. In any case, by means of this elongation of the clamp end 21, an improved force distribution in the clamped state is achieved in the overlapping area, which basically should be selected such that there is an essentially uniform force distribution over the entire circumference of the hose.

Moreover, hose clamp 1' shown in FIGS. 5 through 8 is designed such that, especially in the clamped state, the clamp body 3 has a circular cross section. For this purpose, clamp end 22 has a transverse crosspiece 23 at a distance from first end area 4 that is sufficient to prevent the first end area 4 from being pressed into the interior of clamp body 3 relative to second end area 5. First end area 4 and second end area 5, therefore, lie roughly in a single plane in the peripheral direction.

This hose clamp 1' is now spread by externally attaching a corresponding tool to clamp ends 21, 22 and pressing them towards one another. The spread state is then attained when catch projection 6 engages behind transverse crosspiece 23. This is easily visually detectable by the installer. Otherwise, without the necessity of the installer's paying attention, further spreading beyond the proper spread state is possible, anyway, for only a few millimeters since, immediately after reaching the spread state, further spreading is blocked by the inside of transverse crosspiece 23 making contact with stop 20. Overstretching and possible damage of hose clamp 1', therefore, need not be feared.

Unlocking or loosening of hose clamp 1' can be done by inserting, for example, the tip of a screwdriver into engagement opening 25, and then pressing with the shaft of the screwdriver on the clamp element 21 until stop 20 disengages from transverse crosspiece 23. The same can be achieved by attaching the tool in recess 24 and levering first end area 4 down until unlocking takes place.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

I claim:

1. Hose clamp with a clamp body which is ring-shaped with overlapping end areas for enclosing an end of a hose, said clamp body having an initial diameter and being spreadable to a second larger diameter against an inherent spring force of the clamp body by a clamping tool, a first end area of the clamp body having a catch projection which is offset rearward relative to an end edge thereof and which is engageable with a second end area of the clamp body to releasably maintain the clamp body in said larger diameter, and a longitudinally extending recess being provided in said second end area for holding said first end area, said first end area being smaller than said recess; wherein said catch projection rests against an end edge of the second end area; wherein a stop is formed on the clamp body at a location spaced from the end edge of the first end area, between said end edge and said catch projection; and wherein the catch projection and said stop are formed on a side edge area.

2. Hose clamp according to claim 1, wherein a mechanical overstretch protection means is provided between said end areas for preventing spreading of the clamp body significantly beyond said larger diameter.

3. Hose clamp according to claim 2, wherein a stop is formed on the first end area for interacting with the second end area as said overstretch protection means.

4. Hose clamp according to claim 3, wherein the first end area is provided with a radially aligned first clamp end; wherein the second end area is provided with a radially aligned second clamp end; and wherein the stop interacts with the second clamp end as said overstretch protection means.

5. Hose clamp according to claim 4, wherein a transverse crosspiece is formed on the second clamp end for interacting with the stop.

6. Hose clamp according to claim 5, wherein the transverse crosspiece has a recess which at least partially overlaps the first end area.

7. Hose clamp according to claim 4, wherein the catch projection is located at a distance relative to the stop which is slightly greater than the thickness of the transverse crosspiece.

8. Hose clamp according to claim 7, wherein said distance is about 2 to 5 mm.

9. Hose clamp according to claim 1, wherein the catch projection and the stop are in the shape of branches pointed towards one another and with a short spacing therebetween.

10. Hose clamp according to claim 1, wherein the overlapping end areas provide an essentially uniform distribution of force on the hose in said initial diameter; and wherein said stop is approximately 4 to 15 mm from the first clamp end.

11. Hose clamp according to claim 10, wherein the clamp body in has an essentially circular cross section.

12. Hose clamp according to claim 1, wherein the clamp body in has an essentially circular cross section.

13. Hose clamp with a clamp body which is ring-shaped with overlapping end areas for enclosing an end of a hose, said clamp body having an initial diameter and being spreadable to a second larger diameter against an inherent spring force of the clamp body by a clamping tool, a first end area of the clamp body having a catch projection which is offset rearward relative to an end edge thereof and which is engageable with a second end area of the clamp body to releasably maintain the clamp body in said larger diameter, and a longitudinally extending recess being provided in said second end area for holding said first end area, said first end area being smaller than said recess; wherein said catch projection rests against an end edge of the second end area; wherein a stop is formed on the clamp body at a location spaced from the end edge of the first end area, between said end edge and said catch projection; and wherein the catch projection and the stop are in the shape of branches pointed towards one another and with a short spacing therebetween.

* * * * *